United States Patent
Chen (10) Patent No.: US 11,303,650 B2
(45) Date of Patent: Apr. 12, 2022

(54) METHOD FOR AUTHORIZING PERMISSION TO OPERATE CONTENT OF MAILBOX ACCOUNT AND INSTANT MESSAGING ACCOUNT IN SYSTEM

(71) Applicant: CHENGDU QIANNIUCAO INFORMATION TECHNOLOGY CO., LTD., Sichuan (CN)

(72) Inventor: Dazhi Chen, Meishan (CN)

(73) Assignee: CHENGDU QIANNIUCAO INFORMATION TECHNOLOGY CO., LTD., Sichuan (CN)

( * ) Notice: Subject to any disclaimer, the term of this patent is extended or adjusted under 35 U.S.C. 154(b) by 0 days.

(21) Appl. No.: 16/634,553

(22) PCT Filed: Jul. 27, 2018

(86) PCT No.: PCT/CN2018/097679
§ 371 (c)(1),
(2) Date: Jan. 27, 2020

(87) PCT Pub. No.: WO2019/020120
PCT Pub. Date: Jan. 31, 2019

(65) Prior Publication Data
US 2021/0112071 A1    Apr. 15, 2021

(30) Foreign Application Priority Data
Jul. 28, 2017   (CN) .......................... 201710633280.3

(51) Int. Cl.
*G06F 15/16*    (2006.01)
*H04L 29/06*    (2006.01)
(Continued)

(52) U.S. Cl.
CPC ......... *H04L 63/108* (2013.01); *G06Q 10/107* (2013.01); *H04L 63/105* (2013.01); *H04L 67/306* (2013.01)

(58) Field of Classification Search
CPC ....... H04L 51/00; H04L 51/04; H04L 63/101; H04L 63/102
(Continued)

(56) References Cited

U.S. PATENT DOCUMENTS
2017/0063816 A1*  3/2017  Ackerly .............. H04L 63/0428

FOREIGN PATENT DOCUMENTS
CN    101834878 A    9/2010
CN    102750473 A    10/2012
(Continued)

OTHER PUBLICATIONS

International Search Report in the international application No. PCT/CN2018/097679, dated Oct. 15, 2018.
(Continued)

*Primary Examiner* — Wing F Chan
*Assistant Examiner* — Andrew Woo
(74) *Attorney, Agent, or Firm* — Ladas & Parry, LLP (57) ABSTRACT

A method for authorizing a permission to operate content in a mailbox account or an instant messaging account in a system is disclosed in the present invention. The method for authorizing a permission to operate content in a mailbox account in a system includes: selecting one or more grantees; selecting one or more operated mailbox accounts; setting a permission time range, wherein said permission time range includes one or more of the following four types: a time range from a time point, which is determined by going backwards from a current time for a fixed time length, to the current time, a time range from a start time to a current time, a time range from a deadline to a system initial time, and a
(Continued)

time range from a start time to a deadline; and setting a permission for said grantee to operate content within the permission time range in the operated mailbox account. According to the present invention, the permission can be authorized for the grantee to view data information within a certain time range in the operated mailbox account or the operated instant messaging account according to actual requirements.

8 Claims, 5 Drawing Sheets

(51) Int. Cl.
*G06Q 10/10* (2012.01)
*H04L 67/306* (2022.01)

(58) Field of Classification Search
USPC ..................................... 709/227, 228; 726/4
See application file for complete search history.

(56) References Cited

FOREIGN PATENT DOCUMENTS

| CN | 105245436 A | 1/2016 |
| CN | 107508798 A | 12/2017 |
| CN | 107508800 A | 12/2017 |

OTHER PUBLICATIONS

Written Opinion of the international Searching Authority in the international application No. PCT/CN2018/097679, dated Oct. 15, 2018 with English translation provided by Google Translate.

* cited by examiner

METHOD FOR AUTHORIZING PERMISSION TO OPERATE CONTENT OF MAILBOX ACCOUNT AND INSTANT MESSAGING ACCOUNT IN SYSTEM

CROSS-REFERENCE TO RELATED APPLICATIONS

This application is the U.S. national phase of PCT/CN2018/097679 filed on Jul. 27, 2018, which claims priority to Chinese Application No. 201710633280.3 filed on Jul. 28, 2017, the disclosures of which are incorporated by reference herein in their entireties.

BACKGROUND

Technical Field

The present invention relates to an authorization method in a management software system such as ERP, and in particular, to methods for authorizing a permission to operate content in a mailbox account and an instant messaging account in a system.

Related Art

Role-based access control (RBAC) is one of the most researched and mature permission management mechanisms for databases in recent years. It is considered to be an ideal candidate to replace conventional mandatory access control (MAC) and discretionary access control (DAC). The basic idea of the role-based access control (RBAC) is to divide different roles according to different functional positions in the enterprise organization view, encapsulate the access permission of database resources in roles, and allow users to indirectly access the database resources by assigning different roles to the users.

A large number of tables and views are often built in large-scale application systems, which makes the management and permissions of database resources very complicated. It is very difficult for a user to directly manage the access and permissions of the database resources. It requires the user to have a very thorough understanding of the database structure and to be familiar with the use of the SQL language. Once the application system structure or security requirements have changed, a large number of complex and cumbersome permission changes are required, and the security vulnerabilities caused by unexpected authorization errors are very likely to occur. Therefore, designing a simple and efficient permission management method for large-scale application systems has become a common requirement for systems and system users.

The role-based permission control mechanism can manage the access permissions of the system simply and efficiently, which greatly reduces the burden and cost of the permission management of the system, and makes the permission management of the system more compliant with the business management specifications of the application system.

Figure 1:
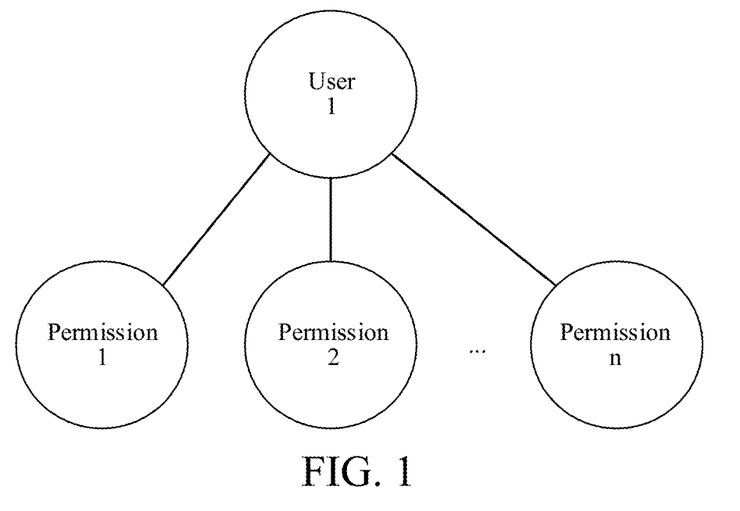
FIG. 1 is a schematic diagram of directly authorizing a user in the prior art.
Figure 2:
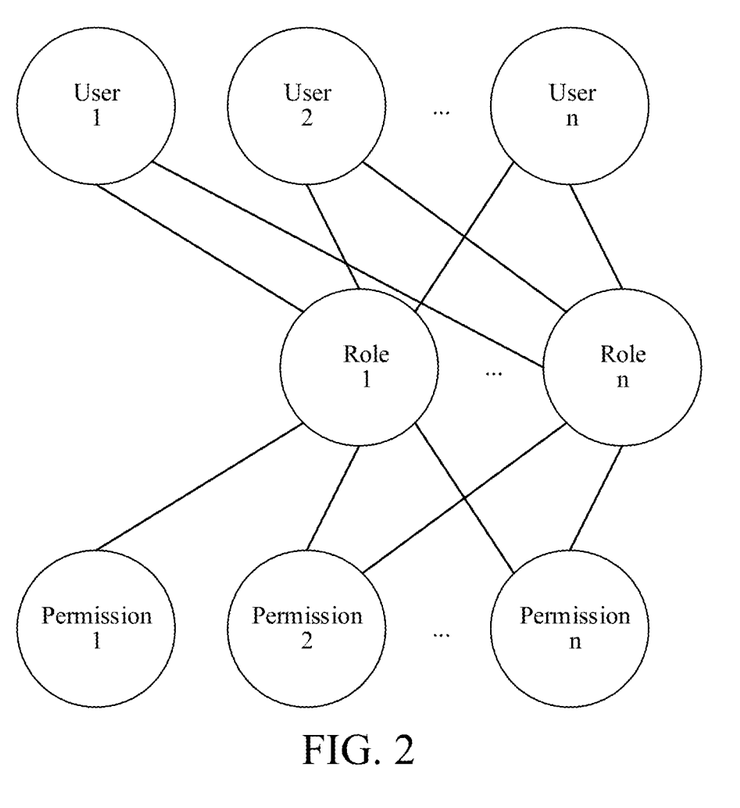
FIG. 2 is a schematic diagram of authorizing a role having the nature of a group/a class in the prior art.
Figure 3:
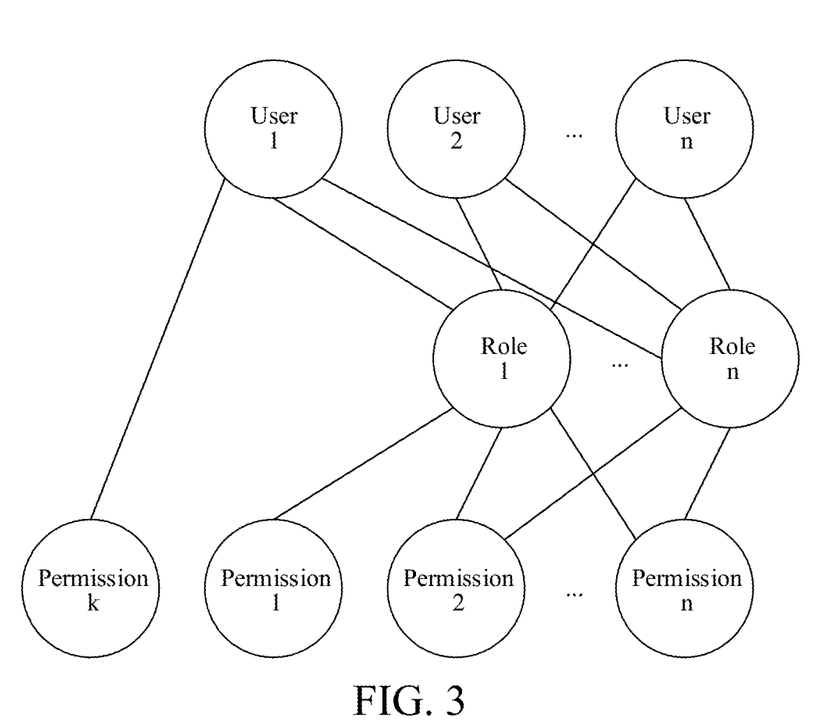
FIG. 3 is a schematic diagram of both directly authorizing a user and a role having the nature of a group/a class in the prior art.

However, the conventional role-based user permission management method adopts the "role-to-user one-to-many" relation mechanism, wherein the "role" has the nature of a group/a class. That is, one role can simultaneously correspond to/be related to multiple users, and the role is similar to a post/a position/a type of work or other concepts. The permission authorization to a user under this relation mechanism is basically divided into the following three forms: 1. As shown in FIG. 1, the permission is directly authorized to the user, where the disadvantage is that the workload is large and the operation is frequent and cumbersome. 2. As shown in FIG. 2, the role (having the nature of a class/a group/a post/a type of work) is authorized (one role may be related to multiple users), and the user obtains permissions through his/her role. 3. As shown in FIG. 3, the above two forms are combined.

In the above descriptions, as both form 2 and form 3 need to authorize the role that has the nature of a class/a group. The way of authorization through the role having the nature of a class/a group/a post/a type of work has the following disadvantages: 1. Operations are difficult when the user's permission has changed. In the actual process of using a system, the user's permissions often need to be adjusted during the operation process. For example, in processing the change of employee's permissions, when the permissions of the employee related to the role have changed, it is improper to change the permissions of the entire role due to the change of the permissions of the individual employee, because this role is also related to other employees whose permissions remain unchanged. Therefore, to deal with this situation, either a new role is created to fit the employee whose permissions have changed, or permissions are directly authorized to the employee (disengaged from the role) based on permission requirements. The above two processing methods not only take a long time but also cause mistakes easily for the role authorization in the case of a large number of role permissions. It is cumbersome for a user to operate, and errors occur easily, resulting in loss to the system user.

2. It is difficult to remember the specific permissions contained in a role for a long time. If the role has many permission function points, as time goes by, it is difficult to remember the specific permissions of the role, and it is even more difficult to remember the permission differences between roles with similar permissions. If a new user needs to be related, it is impracticable to accurately determine how to select a relation.

3. Because user's permissions change, more roles will be created (if new roles are not created, the possibility of direct authorization for the user will be increased greatly), and it is more difficult to distinguish specific differences between permissions of the roles.

4. When a user is transferred from a post, if many permissions of the transferred user need to be assigned to other users, it is necessary to distinguish the permissions of the transferred user and create roles to be related to the other users respectively during the processing. Such operations are not only complicated and time-consuming, but also prone to errors.

In the conventional management software system such as ERP, during authorization for an employee, the employee is usually authorized according to permissions of the employee's post. After obtaining the authorization of a certain mailbox account or instant messaging account, the employee can view all historical data/information and current data/information in the mailbox account or the instant messaging account. However, it easily causes information leakage of the company in some cases. For example, a new employee takes up a post of the company, but is not desired to view the historical data/information in the mailbox account or the instant messaging account taken over by the employee. After obtaining the authorization of the mailbox account or the instant messaging account, the employee can view the historical data/information in the mailbox account or the instant messaging account, and in this case, the company fails to take effective restriction measures, thus leading to the data leakage of the company. For another example, when an employee is temporarily transferred to review the data within a time range in a mailbox account or an instant messaging account of another post, the permission to view the mailbox account or the instant messaging account needs to be authorized to the employee. After obtaining the permission, the employee can view all data/information in the mailbox account or the instant messaging account, causing the leakage of other data in addition to the to-be-reviewed data in the mailbox account or the instant messaging account. Therefore, it can be learned that the existing method for authorizing the permission to view the mailbox account or the instant messaging account cannot achieve permission control effectively in some cases, which is adverse to information security of the company and easily causes loss to the company.

Each time when an employee enters or is transferred from a post, a mailbox account and an instant messaging account need to be related to the employee, which involves large workloads. Moreover, re-relating the mailbox account and the instant messaging account to the employee is delayed in some degree, which affects the normal operation of related work. For example, when an employee A has transferred from a production supervisor to a sales supervisor, if no new mailbox is related to the employee A after the current mailbox of the employee A is handed over to his/her successor, the employee A does not have any mailbox and fails to carry out related work. If the current mailbox of the employee A is not handed over to his/her successor, the successor cannot know previous related email information, which is adverse to launching work. For another example, the employee A who has held two posts: the production supervisor and the after-sales supervisor, now is no longer in the post of the production supervisor (the employee A's mailbox cannot be given to his/her successor, because it also contains work emails of the after-sales supervisor). If a new mailbox is assigned to the successor of the production supervisor, it is also necessary to notify related personnel (for example, equipment maintenance personnel and outsourcing manufacturers), which not only involves large workloads but also imposes extra work to the related personnel. Moreover, the employee A may still view production-type emails generated subsequently (for example, an email sender does not know the resignation of the employee A from the post of the production supervisor). For another example, when the employee A is transferred from the production supervisor to the sales supervisor, if a new mailbox is not assigned to the employee A immediately after the current mailbox of the employee A is handed over to his/her successor, the employee A cannot view emails related to the original sales work during this time range, which is adverse to the normal operation of the work (the conventional authorization management for an instant messaging account also has the problems described above).

The application of the "relation time of an operated mailbox account to its currently-related person" has the following advantages: If the enterprise wants to set operation permissions for the currently-related person by using the relation time as a reference time point, for example, if the company stipulates, out of the management requirement, that after the currently-related person of the operated mailbox account is related to the mailbox, the currently-related person can only operate the content in the mailbox within a time range before or after the relation time, or within a time range from the relation time to a specified time, or the like; or some supervisors are also authorized to operate the content in the operated mailbox account related to a supervisee in such a manner but the relation time is dynamic (many factors such as induction, transfer, and resignation of employees will increase the uncertainty of the relation time, and thus the "relation time" of the operated mailbox account and its currently-related person is uncertain). Therefore, the operation permissions cannot be set according to the conventional methods. However, the method in the present application can perfectly solve such problem.

The application of the "relation time of an operated instant messaging account to its currently-related person" has the following advantage: If the enterprise wants to set operation permissions for the currently-related person by using the relation time as a reference time point, for example, if the company stipulates, out of the management requirement, that after the currently-related person of the operated instant messaging account is related to the instant messaging account, the currently-related person can only operate the content in the instant messaging account within a time range before or after the relation time, or within a time range from the relation time to a specified time, or the like; or some supervisors are also authorized to operate the content in the operated instant messaging account related to a supervisee in such a manner but the relation time is dynamic (many factors such as induction, transfer, and resignation of employees will increase the uncertainty of the relation time, and thus the "relation time" of the operated instant messaging account and its currently-related person is uncertain). Therefore, the operation permissions cannot be set according to the conventional methods. However, the method in the present application can perfectly solve such problem.

In addition, a mailbox account or an instant messaging account is used by different persons successively, which causes information leakage. For example, a mailbox A that contains lots of confidential research and development information is assigned to an employee A in a research and development department initially. After the employee A resigns, the mailbox A is further assigned to an employee B in a sales department. In this case, the employee B can view the original confidential research and development information in the mailbox A. Moreover, an information sender (such as an email information sender and a communication information sender) is unwilling to send information to a mailbox account and an instant messaging account whose user changes constantly, because it easily causes information leakage. For example, after an employee is late for work, his/her supervisor does not deduct his/her salary in view of good business results of the employee, and sends an email to the employee for illustration. If the employee's mailbox is later used by others, this email will be known by the others, which is adverse to the management of the company.

SUMMARY

Technical Problems

The object of the present invention is to overcome the deficiencies of the prior art, and provide a method for authorizing a permission to operate content in a mailbox account and an instant messaging account in a system, so that permissions to view/operate data information within a certain time range in the operated mailbox account or the operated instant messaging account can be authorized for a grantee according to actual requirements.

Solutions to Problems

Technical Solutions

The object of the present invention is achieved by the following technical solutions: A method for authorizing a permission to operate content in a mailbox account in a system includes:

(1) selecting one or more grantees;

(2) selecting one or more operated mailbox accounts;

(3) setting a permission time range, wherein said permission time range includes one or more of the following four types: a time range from a time point, which is determined by going backwards from a current time for a fixed time length, to the current time, a time range from a start time to a current time, a time range from a deadline to a system initial time, and a time range from a start time to a deadline; and (4) setting a permission for said grantee to operate content within the permission time range in the operated mailbox account.

Step (4) is performed at last, and there is no sequential relation among the three steps of step (1), step (2) and step (3).

Preferably, said grantee includes one or more types of a role, a user and an employee, said role is an independent individual not a group/a class, and during the same period, one role can only be related to a unique user, while one user is related to one or more roles.

Preferably, said mailbox account is a role-nature mailbox account and/or an individual-nature mailbox account; said role-nature mailbox account is a mailbox account related to a role according to the work content of the role in the system, and during the same period, one role can only be related to a unique role-nature mailbox account, and one role-nature mailbox account can only be related to a unique role; and said individual-nature mailbox account is a mailbox account directly related to a user/an employee, and during the same period, one user/employee can only be related to a unique individual-nature mailbox account, and one individual-nature mailbox account can only be related to a unique user/employee.

Preferably, after a role-nature mailbox account is related to a role or after a role-nature mailbox account is related to a role and the role-nature mailbox account is used, the role-nature mailbox account related to the role cannot be changed; and after an individual-nature mailbox account is related to a user/an employee or after an individual-nature mailbox account is related to a user/an employee and the individual-nature mailbox account is used, the individual-nature mailbox account related to the user/employee cannot be changed.

A method for authorizing a permission to operate content in a mailbox account in a system includes:

1. selecting one or more grantees;

2. selecting one or more operated mailbox accounts;

3. setting a permission time range, wherein said permission time range includes one or more of the following eight types:

(1) a time range from a relation time of the operated mailbox account and its currently-related person to a system initial time;

(2) a time range from a relation time of the operated mailbox account and its currently-related person to a current time;

(3) with a relation time of the operated mailbox account and its currently-related person as a start point, a time range from a time point, which is determined by going backwards from the start point for a fixed time length, to a current time;

(4) with a relation time of the operated mailbox account and its currently-related person as a start point, a time range from a time point, which is determined by going backwards from the start point for a fixed time length, to the start point;

(5) with a relation time of the operated mailbox account and its currently-related person as a start point, a time range from a time point, which is determined by going forwards from the start point for a fixed time length, to a current time;

(6) with a relation time of the operated mailbox account and its currently-related person as a start point, a time range from a time point, which is determined by going forwards from the start point for a fixed time length, to the start point;

(7) with a relation time of the operated mailbox account and its currently-related person as a start point, a time range from a terminal time point, which is set additionally, to the start point; and (8) with a relation time of the operated mailbox account and its currently-related person as a start point, a time range from a time point A to a time point B, where the time point A is determined by going backwards from the start point for a fixed time length, and the time point B is determined by going forwards from the start time for a fixed time length; and 4. setting a permission for said grantee to operate content within the permission time range in the operated mailbox account.

Step 4 is performed at last, and there is no sequential relation among the three steps of step 1, step 2 and step 3.

The "relation time" of the operated mailbox account and its currently-related person is the "latest relation time" of the operated mailbox account and its currently-related person (if they have been related before, the previous relation time is not used; for example, if Zhang San has been related to a mailbox A three times, only the latest relation time is automatically used as the "relation time" at which Zhang San is related to the mailbox A).

A method for authorizing a permission to operate content in an instant messaging account in a system includes:

(1) selecting one or more grantees;

(2) selecting one or more operated instant messaging accounts;

(3) setting a permission time range, wherein said permission time range includes one or more of the following four types: a time range from a time point, which is determined by going backwards from a current time for a fixed time length, to the current time, a time range from a start time to a current time, a time range from a deadline to a system initial time, and a time range from a start time to a deadline; and (4) setting a permission for said grantee to operate content within the permission time range in the operated instant messaging account.

Step (4) is performed at last, and there is no sequential relation among the three steps of step (1), step (2) and step (3).

Preferably, said grantee includes one or more types of a role, a user and an employee, said role is an independent individual not a group/a class, and during the same period, one role can only be related to a unique user, while one user is related to one or more roles.

Preferably, said instant messaging account is a role-nature instant messaging account and/or an individual-nature instant messaging account; said role-nature instant messaging account is an instant messaging account related to a role according to the work content of the role in the system, and during the same period, one role can only be related to a unique role-nature instant messaging account, and one role-nature instant messaging account can only be related to a unique role; and said individual-nature instant messaging account is an instant messaging account directly related to a user/an employee, and during the same period, one user/employee can only be related to a unique individual-nature instant messaging account, and one individual-nature instant messaging account can only be related to a unique user/employee.

Preferably, after a role-nature instant messaging account is related to a role or after a role-nature instant messaging account is related to a role and the role-nature instant messaging account is used, the role-nature instant messaging account related to the role cannot be changed; and after an individual-nature instant messaging account is related to a user/an employee or after an individual-nature instant messaging account is related to a user/an employee and the individual-nature instant messaging account is used, the individual-nature instant messaging account related to the user/employee cannot be changed.

A method for authorizing a permission to operate content in an instant messaging account in a system includes:

1. selecting one or more grantees;
2. selecting one or more operated instant messaging accounts;
3. setting a permission time range, wherein said permission time range includes one or more of the following eight types:

(1) a time range from a relation time of the operated instant messaging account and its currently-related person to a system initial time;

(2) a time range from a relation time of the operated instant messaging account and its currently-related person to a current time;

(3) with a relation time of the operated instant messaging account and its currently-related person as a start point, a time range from a time point, which is determined by going backwards from the start point for a fixed time length, to a current time;

(4) with a relation time of the operated instant messaging account and its currently-related person as a start point, a time range from a time point, which is determined by going backwards from the start point for a fixed time length, to the start point;

(5) with a relation time of the operated instant messaging account and its currently-related person as a start point, a time range from a time point, which is determined by going forwards from the start point for a fixed time length, to a current time;

(6) with a relation time of the operated instant messaging account and its currently-related person as a start point, a time range from a time point, which is determined by going forwards from the start point for a fixed time length, to the start point;

(7) with a relation time of the operated instant messaging account and its currently-related person as a start point, a time range from a terminal time point, which is set additionally, to the start point; and (8) with a relation time of the operated instant messaging account and its currently-related person as a start point, a time range from a time point A to a time point B, where the time point A is determined by going backwards from the start point for a fixed time length, and the time point B is determined by going forwards from the start time for a fixed time length; and 4. setting a permission for said grantee to operate content within the permission time range in the operated instant messaging account.

Step 4 is performed at last, and there is no sequential relation among the three steps of step 1, step 2 and step 3.

The "relation time" of the operated instant messaging account and its currently-related person is the "latest relation time" of the operated instant messaging account and its currently-related person (if they have been related before, the previous relation time is not used; for example, if Zhang San has been related to an instant messaging account A three times, only the latest relation time is automatically used as the "relation time" at which Zhang San is related to the instant messaging account A).

Beneficial Effects of the Invention
Beneficial Effects

The present invention has the following beneficial effects:

(1) In the present invention, the permissions to operate (such as view and delete) data information within a certain time range in an operated mailbox account or an operated instant messaging account can be set for a grantee according to actual requirements, and the grantee cannot operate data information out of this time range, thus satisfying the requirements for operating data information in the mailbox account or the instant messaging account in various time-limited cases.

For example, if an employee A is only desired to view email data after 2016 in the mailbox account A, a start time for the employee A to view the email data in the mailbox account A is set to 2016. If an employee B is only desired to view communication data between 2013 and 2015 in an instant messaging account B, a start time and a deadline for the employee B to view the communication data of the instant messaging account B are set to 2013 and 2015. By setting an operable mailbox account or instant messaging account for each employee and a time range during which data in the mailbox account or the instant messaging account is operable, the employee can only operate data information within the corresponding time range in the operable mailbox account or instant messaging account, thus reducing the possibility of data information leakage of the mailbox account and the instant messaging account, and improving the data information security of the mailbox account and the instant messaging account.

(2) In the present invention, the permission time range can be set to one or more of the following eight types: "a time range from a relation time of the operated mailbox account and its currently-related person to a system initial time", "a time range from a relation time of the operated mailbox account and its currently-related person to a current time", "with a relation time of the operated mailbox account and its currently-related person as a start point, a time range from a time point, which is determined by going backwards from the start point for a fixed time length, to a current time", "with a relation time of the operated mailbox account and its currently-related person as a start point, a time range from a time point, which is determined by going backwards from the start point for a fixed time length, to the start point", "with a relation time of the operated mailbox account and its currently-related person as a start point, a time range from a time point, which is determined by going forwards from the start point for a fixed time length, to a current time", "with a relation time of the operated mailbox account and its currently-related person as a start point, a time range from a time point, which is determined by going forwards from the start point for a fixed time length, to the start point", "with a relation time of the operated mailbox account and its currently-related person as a start point, a time range from a terminal time point, which is set additionally, to the start point" and "with a relation time of the operated mailbox account and its currently-related person as a start point, a time range from a time point A to a time point B, wherein the time point A is determined by going backwards from the start point for a fixed time length, and the time point B is determined by going forwards from the start time for a fixed time length", which helps to quickly distinguish email data of a historically-related person who operates the mailbox account from email data of the currently-related person, helps to prevent the currently-related person from viewing sensitive information or negative information in history (there may be sensitive or negative information in historical information, and information with a long history is meaningless for the work), helps a supervisor to analyze related information of a non-currently-related person, helps the enterprise to prevent the currently-related person from viewing too much sensitive information or negative information in history but allow the currently-related person to know related information in a previous time range when taking up the new work, and helps to understand/analyze/supervise information within a time range before and/or after the relation time of the currently-related person.

In the present invention, the permission time range can be set to one or more of the following eight types: "a time range from a relation time of the operated instant messaging account and its currently-related person to a system initial time", "a time range from a relation time of the operated instant messaging account and its currently-related person to a current time", "with a relation time of the operated instant messaging account and its currently-related person as a start point, a time range from a time point, which is determined by going backwards from the start point for a fixed time length, to a current time", "with a relation time of the operated instant messaging account and its currently-related person as a start point, a time range from a time point, which is determined by going backwards from the start point for a fixed time length, to the start point", "with a relation time of the operated instant messaging account and its currently-related person as a start point, a time range from a time point, which is determined by going forwards from the start point for a fixed time length, to a current time", "with a relation time of the operated instant messaging account and its currently-related person as a start point, a time range from a time point, which is determined by going forwards from the start point for a fixed time length, to the start point", "with a relation time of the operated instant messaging account and its currently-related person as a start point, a time range from a terminal time point, which is set additionally, to the start point" and "with a relation time of the operated instant messaging account and its currently-related person as a start point, a time range from a time point A to a time point B, wherein the time point A is determined by going backwards from the start point for a fixed time length, and the time point B is determined by going forwards from the start time for a fixed time length", which helps to quickly distinguish instant messaging data of a historical related person who operates the instant messaging account from instant messaging data of the currently-related person, helps to prevent the currently-related person from viewing sensitive information or negative information in history (there may be sensitive or negative information in historical information, and information with a long history is meaningless for the work), helps a supervisor to analyze related information of a non-currently-related person, helps the enterprise to prevent the currently-related person from viewing too much sensitive information or negative information in history but allow the currently-related person to know related information in a previous time range when taking up the new work, and helps to understand/analyze/supervise information within a time range before and/or after the relation time of the currently-related person.

For example, an employee A is a currently-related person of a mailbox A, and an employee B is a historically-related person of the mailbox A. An employee C needs to view email data in the mailbox A within a time range during which the mailbox A is related to the employee B, and the permission of the employee C can be directly set to be viewing email data in the mailbox A within a time range before the mailbox A is related to the employee A.

For example, an employee A is a currently-related person of a mailbox A, and an employee B is a historically-related person of the mailbox A. The employee A is only desired to view email data in the mailbox A within a time range during which the mailbox A is related to the employee A, and the permission of the employee A can be directly set to be viewing email data in the mailbox A within a time range after the mailbox A is related to the employee A.

For example, an employee A is a currently-related person of an instant messaging account A, and an employee B is a historically-related person of the instant messaging account A. An employee C needs to view instant messaging data in the instant messaging account A within a time range during which the instant messaging account A is related to the employee A, and the permission of the employee C can be directly set to be viewing instant messaging data in the instant messaging account A within a time range after the instant messaging account A is related to the employee A.

For example, an employee A is a currently-related person of an instant messaging account A, and an employee B is a historically-related person of the instant messaging account A. The employee A is only desired to view instant messaging data in the instant messaging account A within a time range during which the instant messaging account A is related to the employee A, and the permission of the employee A can be directly set to be viewing instant messaging data in the instant messaging account A within a time range after the instant messaging account A is related to the employee A.

(3) In the present invention, the corresponding role-nature mailbox account and/or the role-nature instant messaging account is related to the role according to the work content in the role. An information sender (for example, an email information sender and a communication information sender) does not need to worry that information sent to the role-nature mailbox account or the role-nature instant messaging account of a certain role is known by irrelevant persons, because the current user of the role-nature mailbox account or the role-nature instant messaging account is definitely responsible for the related work. As the role is related to the role-nature mailbox account and/or the role-nature instant messaging account, the corresponding role-nature mailbox account and/or role-nature instant messaging account is automatically assigned to an employee when a post number or work is assigned to the employee, and it is thus unnecessary to separately assign the role-nature mailbox account and/or the role-nature instant messaging account to the employee. Moreover, the assignment of the role-nature mailbox account and/or the role-nature instant messaging account is not delayed in cases of employee resignation, transfer, induction and the like, thus reducing the workloads of assigning the mailbox account and/or the instant messaging account.

For example, the work content of a role A is to conduct attendance statistics, and the role A is related to a mailbox A. In this case, after the role A is related to a user corresponding to an employee A, the employee A becomes the current user of the mailbox A, while the current work content of the employee A definitely includes conducting attendance statistics. After an email sender sends an attendance-related email to the mailbox A, the attendance-related email will be invisible to irrelevant persons.

For example, a role A is related to a mailbox account A and an instant messaging account A. After the role A is related to a user corresponding to an employee A, the mailbox account A and the instant messaging account A are automatically assigned to the employee A or the user corresponding to the employee A.

(4) After an employee is transferred from a post or resigns, when being assigned to another person, the role-nature mailbox account or the role-nature instant messaging account related to the role corresponding to the employee will not be assigned to an employee not responsible for the work content of the role or a user corresponding to the employee, which ensures that data information in the role-nature mailbox account and the role-nature instant messaging account will not be leaked to irrelevant persons after the user of the role-nature mailbox account and the role-nature instant messaging account has changed.

For example, a user corresponding to an employee A is related to roles: an electrical appliance salesperson 1 and a software salesperson 1. After the employee A resigns, the electrical appliance salesperson 1 is related to a user corresponding to an employee B, and the software salesperson 1 is related to a user corresponding to an employee C. In this case, the employee B obtains a role-nature mailbox account A and a role-nature instant messaging account A that are related to the electrical appliance salesperson 1, and the employee C obtains a role-nature mailbox account B and a role-nature instant messaging account B that are related to the software salesperson 1. Then, the employee B can only view data information in the role-nature mailbox account A and the role-nature instant messaging account A, but cannot view data information in the role-nature mailbox account B and the role-nature instant messaging account B. Similarly, the employee C can only view data information in the role-nature mailbox account B and the role-nature instant messaging account B, but cannot view data information in the role-nature mailbox account A and the role-nature instant messaging account A.

(5) The individual-nature mailbox account and/or the individual-nature instant messaging account are set for the user/employee, and are used for receiving and sending emails and/or communication information related to private information of the user/employee, which achieves the separation of work emails from private emails, and the separation of work communication information from private communication information. As the individual-nature mailbox account and the individual-nature instant messaging account of the user/employee will not be assigned to other employees/users, it is unnecessary to worry about the problem of private information leakage caused by the handover of the mailbox account and the instant messaging account as the work changes.

For example, an employee A is late for work and his/her supervisor does not deduct his/her salary in view of good business results of the employee A, and an email for illustration may be sent to the individual-nature mailbox account of the employee A, without worrying that the email is later seen by an employee who takes over the employee A's work after the employee A resigns or is transferred, and brings negative influence to the company.

(6) The conventional permission management mechanism defines the nature of a group, a type of work, a class or the like as the role. The role is in a one-to-many relation to the user. In the actual process of using a system, the user's permissions often need to be adjusted during the operation process. For example, in processing the change of an employee's permissions, when the permissions of an employee related to the role have changed, it is improper to change the permissions of the entire role due to the change of the permissions of the individual employee, because this role is also related to other employees whose permissions remain unchanged. To deal with this situation, either a new role is created to fit the employee whose permissions have changed, or permissions are directly authorized to the employee (disengaged from the role) based on permission requirements. The above two processing methods not only take a long time but also cause mistakes easily for the role authorization in the case of a large number of role permissions. It is cumbersome for a user to operate, and errors occur easily, resulting in loss to the system user.

However, under the method of the present application, as the role is an independent individual, the object can be achieved by changing the permissions of the role. Although the method in the present application seems to increase the workload during system initialization, by means of copying or the like, the role can be created or authorized more efficiently than the conventional roles having the nature of a group. As it is unnecessary to consider the commonality of the roles having the nature of a group when satisfying the related users, the solutions in the present application make the permission setting clear and explicit. Especially after the system has been used for a period of time (after the permissions of the user/role have changed dynamically), the solutions in the present application can significantly improve the permission management efficiency for the system user in using the system, make the dynamic authorization simpler, more convenient, clearer and more explicit, and improve the efficiency and reliability of the permission setting.

(7) The conventional group-based role authorization method is prone to errors. The method provided in the present application significantly reduces the probability of authorization errors, because the method of the present application only needs to consider the role as an independent individual, without considering the commonality of multiple users related to the role having the nature of a group under the conventional method. Even if errors occur in authorization, only the user related to the role is affected. However, in the case of the conventional role having the nature of a group, all users related to the role are affected. Even if errors occur authorization, the correction method in the present application is simple and takes a short time, while in the case of the conventional role having the nature of a group, the commonality of the permissions of all users related to the role needs to be considered during correcting the errors. The modification is cumbersome, complex, and error-prone when there are many function points, and in many cases, the problem cannot be solved unless a new role is created.

(8) In the conventional group-based role authorization method, if the role has many permission function points, as time goes by, it is difficult to remember the specific permissions of the role, and it is even more difficult to remember the permission differences between roles with similar permissions. If a new user needs to be related, it cannot be accurately determined how to select a relation. In the method of the present application, the role itself has the nature of a post number/a station number, such that the selection can be made easily.

(9) When a user is transferred from a post, if many permissions of the transferred user need to be assigned to other users, in processing, it is necessary to distinguish the permissions of the transferred user and create roles to relate to other users respectively. The operations are complicated, time-consuming, and prone to errors.

The method in the present application is as follows: The transferred user is related to several roles. When the user is transferred, the relation between the user and the roles in the original department is first canceled (the canceled roles may be re-related to other users), and then the user is related to a role in a new department. The operation is simple and not error-prone.

(10) A department needs to be selected when or after a role is created. Once the department is selected for the role, the department cannot be replaced. Reasons why the department to which the role belongs cannot be replaced are as follows: Reason 1: As the role in the present application is equivalent to a station number or a post number in nature, different station numbers or post numbers have different work content or permissions. For example, the role of a salesperson 1 under a sales department and the role of a developer 1 under a technical department are two completely different station numbers or post numbers, and have different permissions. Reason 2: If the department (sales department) to which the role of the salesperson 1 belongs is replaced by the technical department without changing the permissions of the role of the salesperson 1, the role that owns the permissions of the sales department exists in the technical department. This leads to management confusion and security vulnerabilities.

DETAILED DESCRIPTION

Description of Embodiments

The technical solutions of the present invention will be further described in detail below with reference to the figures, but the protection scope of the present invention is not limited to the following descriptions.

Figure 4:
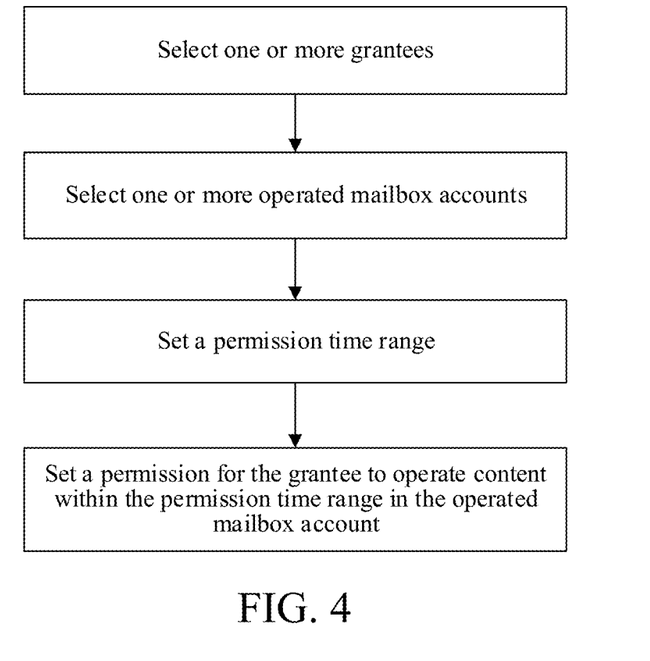
FIG. 4 is a schematic flowchart of a method for authorizing a permission to operate content in a mailbox account in a system in the present invention.

[Embodiment 1] As shown in FIG. 4, a method for authorizing a permission to operate content in a mailbox account in a system includes: S01, selecting one or more grantees. The grantee includes one or more types of a role, a user, and an employee.

Figure 5:
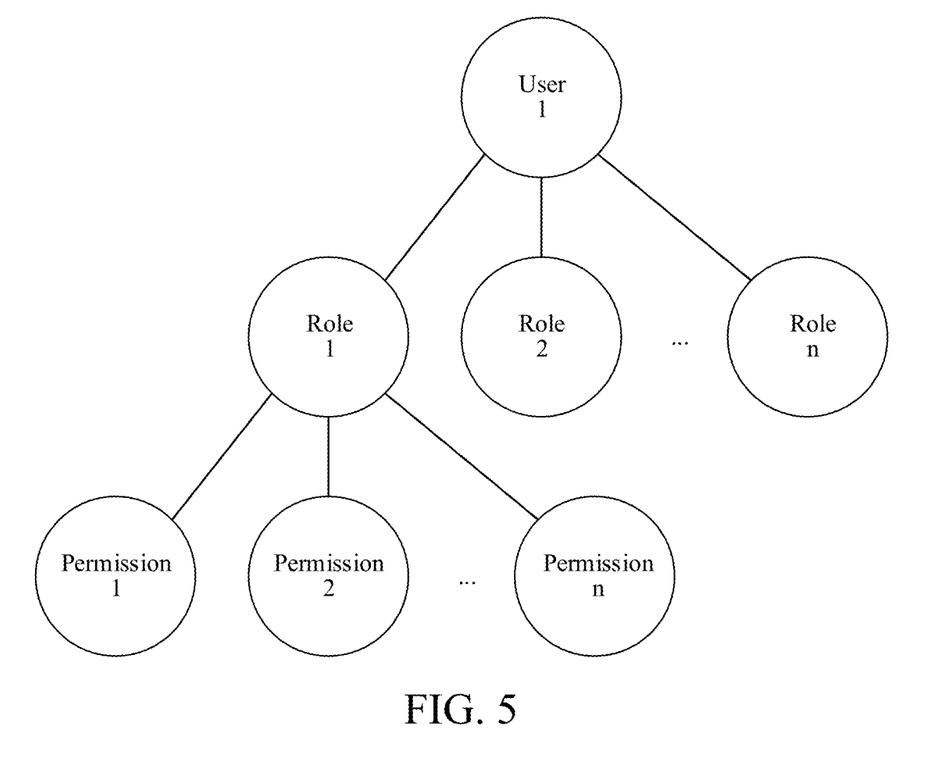
FIG. 5 is a schematic diagram of authorizing a user through a role having the nature of an independent individual in the present invention.

As shown in FIG. 5, the role is an independent individual not a group/a class, and during the same period, one role can only be related to a unique user, while one user is related to one or more roles. The user obtains permissions of the related role. When a role is created or after a role is created, a department is selected for the role, and therefore the role belongs to the department. The role is authorized according to the work content of the role; the name of the role is unique under the department, and the number of the role is unique in the system.

Definition of a role: A role does not have the nature of a group/a class/a category/a post/a position/a type of work or the like, but has a non-collective nature. The role is unique and is an independent individual. Applied in an enterprise or an institution, the role is equivalent to a post number (the post number herein is not a post, and one post may have multiple employees at the same time, but one post number can only correspond to one employee during the same period).

For example, in a company system, the following roles may be created: a general manager, a deputy general manager 1, a deputy general manager 2, a manager of Beijing sales department I, a manager of Beijing sales department II, a manager of Beijing sales department III, a Shanghai sales engineer 1, a Shanghai sales engineer 2, a Shanghai sales engineer 3, a Shanghai sales engineer 4, a Shanghai sales engineer 5, and so on. The relation between users and roles is as follows: if Zhang San, the company's employee, serves as a deputy general manager 2 of the company and also serves as a manager of Beijing sales department I, the roles to which Zhang San needs to be related are the deputy general manager 2 and the manager of Beijing sales department I, and Zhang San owns the permissions of the two roles.

The concept of conventional roles is a group/a class/a post/a position/a type of work in nature, and one role can correspond to multiple users. However, in the present application, the concept of "role" is equivalent to a post number/a station number, and is also similar to the role in a film and television drama: one role (in childhood, juvenile, middle-age . . . ) can be played by only one actor or actress during the same period, but one actor or actress may play multiple roles.

When a user is transferred across the departments, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and an employee determines (obtains) permissions through a role related to his/her corresponding user. An employee and a user are bound permanently. After a user corresponds to an employee, the user belongs to the employee, and the user can no longer be related to other employees. If the employee resigns, the user cannot correspond to other employees. After the employee is recruited again, the employee still uses the original user.

The method further includes S02: Selecting one or more operated mailbox accounts.

The mailbox account is a role-nature mailbox account and/or an individual-nature mailbox account.

The role-nature mailbox account is a mailbox account related to a role according to the work content of the role in the system, and during the same period, one role can only be related to a unique role-nature mailbox account, and one role-nature mailbox account can only be related to a unique role.

The relation between the role-nature mailbox account and the role is as follows: one role-nature mailbox account corresponds to one role, and one role corresponds to one role-nature mailbox account.

In this embodiment, the role-nature mailbox account related to the role can be changed or cannot be changed, which is specifically as follows: Firstly, the role-nature mailbox account related to the role cannot be changed, that is, after a role-nature mailbox account is related to a role, the role-nature mailbox account related to the role cannot be changed, or after a role-nature mailbox account is related to a role and the role-nature mailbox account is used, the role-nature mailbox account related to the role cannot be changed. Even if a role is no longer used, the role-nature mailbox account related to the role cannot be related to other roles, but the grantee corresponding to the role can still operate the role-nature mailbox account. Secondly, the role-nature mailbox account related to the role can be changed. When a role-nature mailbox account needs to be changed for a role, the role's relation to the original role-nature mailbox account is canceled, and the role is related to a new role-nature mailbox account.

The source of the role-nature mailbox account includes one or two of the following two types: 1. The role-nature mailbox account is a mailbox account of a mailbox application in the system (a mailbox account in the system), and a step of creating the role-nature mailbox account is further included in this case. 1. The role-nature mailbox account is a mailbox account of a mailbox service provided by a third party, for example, a Netease mailbox account, a QQ mailbox account, or the like.

The individual-nature mailbox account is a mailbox account directly related to a user/an employee, and during the same period, one user/employee can only be related to a unique individual-nature mailbox account, and one individual-nature mailbox account can only be related to a unique user/employee.

After an employee resigns, the individual-nature mailbox account related to the employee and the user corresponding to the employee will be suspended, that is, the individual-nature mailbox account will not be assigned to other employees/users either, which ensures that email content in the individual-nature mailbox account will not be leaked, but the corresponding grantee can still operate the individual-nature mailbox account. If the employee is re-employed by the company after resignation, the original individual-nature mailbox account is automatically re-allocated to the employee and/or the user corresponding to the employee (once being related to the user, the individual-nature mailbox account is constantly in a related state and cannot be changed; once being related to the employee, the individual-nature mailbox account is constantly in a related state and cannot be changed).

After an individual-nature mailbox account is related to a user/an employee, the individual-nature mailbox account related to the user/employee cannot be changed; or after an individual-nature mailbox account is related to a user/an employee and the individual-nature mailbox account is used, the individual-nature mailbox account related to the user/employee cannot be changed.

When an email is sent, the email is sent by using a corresponding role-nature mailbox account if it is a work email, and the email is sent by using an individual-nature mailbox account if it is a non-work email. By setting the individual-nature mailbox account for receiving non-work emails for the user/employee, the separation of work emails from non-work emails is achieved, which helps to keep personal private information secret.

The method further includes S03: Setting a permission time range, wherein the permission time range includes one or more of the following four types: a time range from a time point, which is determined by going backwards from a current time for a fixed time length, to the current time, a time range from a start time to a current time, a time range from a deadline to a system initial time, and a time range from a start time to a deadline The permission time range further includes a time range from a system initial time to a current time.

The unit for setting the permission time range may be year, month, day, hour, minute, second, and the like.

The above five types of time ranges are described below by examples: a time range from a time point, which is determined by going backwards from a current time for a fixed time length, to the current time. For example, on Jun. 20, 2017, an employee A is authorized to view email data within a time range from a time point, which is determined by going backwards 6 days from Jun. 20, 2017, to Jun. 20, 2017 in a mailbox A. That is, on Jun. 20, 2017, the employee A can view email data from Jun. 15, 2017 to Jun. 20, 2017 in the mailbox A; on Jun. 21, 2017, the employee A can view email data from Jun. 16, 2017 to Jun. 21, 2017 in the mailbox A; on Jun. 22, 2017, the employee A can view email data from Jun. 17, 2017 to Jun. 22, 2017 in the mailbox A, and so on. That is, the time length of the time range is fixed, and the start time and the deadline are both variable.

The time range from a start time to a current time (the current time is dynamic): for example, on May 1, 2015, the employee A is authorized to view email data from Feb. 1, 2015 to the current date (current time) in the mailbox A. Then, the employee A can view email data from Feb. 1, 2015 to May 1, 2015 in the mailbox A.

The time range from a deadline to a system initial time: for example, the employee A is authorized to view email data from Feb. 1, 2015 to the system initial time in the mailbox A. Then, the employee A can view email data from Feb. 1, 2015 to the system initial time in the mailbox A (further, the system initial time may not be set and only the deadline is set, and in this case, the employee A can view all emails on and before the deadline in the mailbox A).

The time range from a start time to a deadline: for example, the employee A is authorized to view email data from Feb. 1, 2015 to Jun. 1, 2015 in the mailbox A. Then, the employee A can view email data from Feb. 1, 2015 to Jun. 1, 2015 in the mailbox A.

The time range from a system initial time to a current time (the current time is dynamic): for example, on Jun. 1, 2017, the employee A is authorized to view email data from the system initial time to the current time in the mailbox A. Then, on Jun. 1, 2017, the employee A can view email data from the system initial time to Jun. 1, 2017 in the mailbox A; on Jun. 2, 2017, the employee A can view email data from the system initial time to Jun. 2, 2017 in the mailbox, and so on.

The method further includes S04: Setting a permission for the grantee to operate the content within the permission time range in the operated mailbox account.

The operation performed by the grantee on the operated mailbox account includes one or more types of viewing data, deleting data, and the like. After the permission is set, the grantee can operate email information within the permission time range in the operated mailbox account.

[Embodiment 2] A method for authorizing a permission to operate content in a mailbox account in a system includes: S11, selecting one or more grantees. The grantee includes one or more types of a role, a user, and an employee.

The role is an independent individual not a group/a class, and during the same period, one role can only be related to a unique user, while one user is related to one or more roles. The user obtains permissions of the related role. When a role is created or after a role is created, a department is selected for the role, and therefore the role belongs to the department. The role is authorized according to the work content of the role; the name of the role is unique under the department, and the number of the role is unique in the system.

When the user is transferred across the departments, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and an employee determines (obtains) permissions through a role related to his/her corresponding user. An employee and a user are bound permanently. After a user corresponds to an employee, the user belongs to the employee, and the user can no longer be related to other employees. If the employee resigns, the user cannot correspond to other employees. After the employee is recruited again, the employee still uses the original user.

The method further includes S12: Selecting one or more operated mailbox accounts.

The mailbox account is a role-nature mailbox account and/or an individual-nature mailbox account.

The role-nature mailbox account is a mailbox account related to a role according to the work content of the role in the system, wherein during the same period, one role can only be related to a unique role-nature mailbox account, and one role-nature mailbox account can only be related to a unique role The relation between the role-nature mailbox account and the role is as follows: one role-nature mailbox account corresponds to one role, and one role corresponds to one role-nature mailbox account.

In this embodiment, the role-nature mailbox account related to the role can be changed or cannot be changed, which is specifically as follows: Firstly, the role-nature mailbox account related to the role cannot be changed, that is, after a role-nature mailbox account is related to a role, the role-nature mailbox account related to the role cannot be changed, or after a role-nature mailbox account is related to a role and the role-nature mailbox account is used, the role-nature mailbox account related to the role cannot be changed. Secondly, the role-nature mailbox account related to the role can be changed. When a role-nature mailbox account needs to be changed for a role, the role's relation to the original role-nature mailbox account is canceled, and the role is related to a new role-nature mailbox account.

The source of the role-nature mailbox account includes one or two of the following two types: 1. The role-nature mailbox account is a mailbox account of a mailbox application in the system (a mailbox account in the system), and a step of creating the role-nature mailbox account is further included in this case. 2. The role-nature mailbox account is a mailbox account of a mailbox service provided by a third party, for example, a Netease mailbox account, a QQ mailbox account, or the like.

The individual-nature mailbox account is a mailbox account directly related to a user/an employee, and during the same period, one user/employee can only be related to a unique individual-nature mailbox account, and one individual-nature mailbox account can only be related to a unique user/employee.

After an individual-nature mailbox account is related to a user/an employee, the individual-nature mailbox account related to the user/employee cannot be changed; or after an individual-nature mailbox account is related to a user/an employee and the individual-nature mailbox account is used, the individual-nature mailbox account related to the user/employee cannot be changed.

The method further includes S13: Setting a permission time range, wherein the permission time range includes one or more of the following eight types:

(1) a time range from a relation time of the operated mailbox account and its currently-related person to a system initial time;

(2) a time range from a relation time of the operated mailbox account and its currently-related person to a current time;

(3) with a relation time of the operated mailbox account and its currently-related person as a start point, a time range from a time point, which is determined by going backwards from the start point for a fixed time length, to a current time;

(4) with a relation time of the operated mailbox account and its currently-related person as a start point, a time range from a time point, which is determined by going backwards from the start point for a fixed time length, to the start point;

(5) with a relation time of the operated mailbox account and its currently-related person as a start point, a time range from a time point, which is determined by going forwards from the start point for a fixed time length, to a current time;

(6) with a relation time of the operated mailbox account and its currently-related person as a start point, a time range from a time point, which is determined by going forwards from the start point for a fixed time length, to the start point;

(7) with a relation time of the operated mailbox account and its currently-related person as a start point, a time range from a terminal time point, which is set additionally, to the start point; and (8) with a relation time of the operated mailbox account and its currently-related person as a start point, a time range from a time point A to a time point B, where the time point A is determined by going backwards from the start point for a fixed time length, and the time point B is determined by going forwards from the start time for a fixed time length.

The method further includes S14: Setting a permission for the grantee to operate content within the permission time range in the operated mailbox account.

The operation performed by the grantee on the operated mailbox account includes one or more types of viewing data, deleting data, and the like. After the permission is set, the grantee can operate one or more types of email information within the permission time range in the operated mailbox account.

Figure 6:
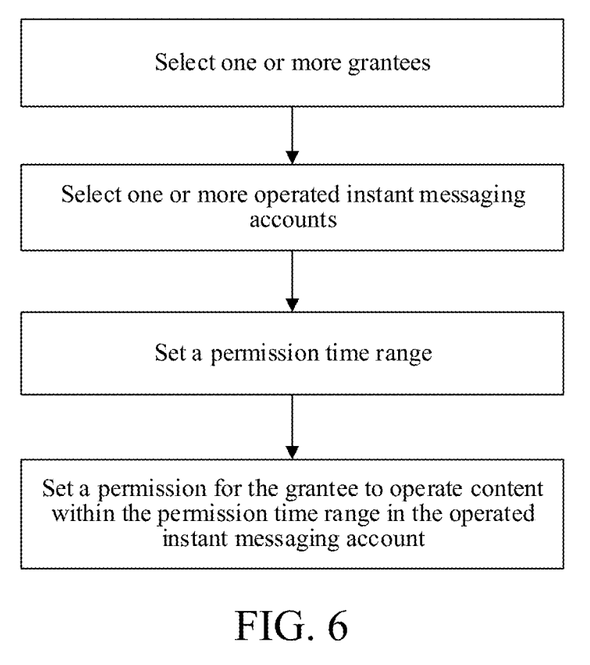
FIG. 6 is a schematic flowchart of a method for authorizing a permission to operate content in an instant messaging account in a system in the present invention.

[Embodiment 3] As shown in FIG. 6, a method for authorizing a permission to operate content in an instant messaging account in a system includes: S21, selecting one or more grantees. The grantee includes one or more types of a role, a user, and an employee.

The role is an independent individual not a group/a class, wherein during the same period one role can only be related to a unique user, while one user is related to one or more roles. The user obtains permissions of the related role. When a role is created or after a role is created, a department is selected for the role, and therefore the role belongs to the department. The role is authorized according to the work content of the role; the name of the role is unique under the department, and the number of the role is unique in the system.

When the user is transferred across the departments, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and an employee determines (obtains) permissions through a role related to his/her corresponding user. An employee and a user are bound permanently. After a user corresponds to an employee, the user belongs to the employee, and the user can no longer be related to other employees. If the employee resigns, the user cannot correspond to other employees. After the employee is recruited again, the employee still uses the original user.

The method further includes S22: Selecting one or more operated instant messaging accounts.

The instant messaging account is a role-nature instant messaging account and/or an individual-nature instant messaging account.

The role-nature instant messaging account is an instant messaging account related to a role according to the work content of the role in the system, and during the same period, one role can only be related to a unique role-nature instant messaging account, and one role-nature instant messaging account can only be related to a unique role.

The relation between the role-nature instant messaging account and the role is as follows: one role-nature instant messaging account corresponds to one role, and one role corresponds to one role-nature instant messaging account.

In this embodiment, the role-nature instant messaging account related to the role can be changed or cannot be changed, which is specifically as follows: Firstly, the role-nature instant messaging account related to the role cannot be changed, that is, after a role-nature instant messaging account is related to a role, the role-nature instant messaging account related to the role cannot be changed, or after a role-nature instant messaging account is related to a role and the role-nature instant messaging account is used, the role-nature instant messaging account related to the role cannot be changed. Even if a role is no longer used, the role-nature instant messaging account related to the role cannot be related to other roles, but the grantee corresponding to the role can still view the information in the role-nature instant messaging account. Secondly, the role-nature instant messaging account related to the role can be changed. When a role-nature instant messaging account needs to be changed for a role, the role's relation to the original role-nature instant messaging account is canceled, and the role is related to a new role-nature instant messaging account.

The source of the role-nature instant messaging account includes one or two of the following two types: 1. The role-nature instant messaging account is an instant messaging account of an instant messaging application in the system (an instant messaging account in the system), and a step of creating the role-nature instant messaging account is further included in this case. 2. The role-nature instant messaging account is an instant messaging account of instant messaging software provided by a third party (for example, a qq number, a Wechat number, or the like).

The individual-nature instant messaging account is an instant messaging account directly related to a user/an employee, and during the same period, one user/employee can only be related to a unique individual-nature instant messaging account, and one individual-nature instant messaging account can only be related to a unique user/employee.

After an employee resigns, the individual-nature instant messaging account related to the employee and the user corresponding to the employee will be suspended, that is, the individual-nature instant messaging account will not be assigned to other employees/users, which ensures that communication content in the individual-nature instant messaging account will not be leaked, but the corresponding grantee can still operate the individual-nature instant messaging account. If the employee returns to the company after resignation, the original individual-nature instant messaging account is automatically used by the employee and/or the user corresponding to the employee again (once being related to the user or employee, the individual-nature instant messaging account is constantly in a related state).

After an individual-nature instant messaging account is related to a user/an employee, the individual-nature instant messaging account related to the user/employee cannot be changed; or after an individual-nature instant messaging account is related to a user/an employee and the individual-nature instant messaging account is used, the individual-nature instant messaging account related to the user/employee cannot be changed.

When information is sent, the information is sent by using a corresponding role-nature instant messaging account if it is work information, and the information is sent by using an individual-nature instant messaging account if it is non-work information. By setting the individual-nature instant messaging account for receiving non-work information for the user/employee, the separation of work information from non-work information is achieved, which helps to keep personal private information secret.

The method further includes: S23: Setting a permission time range, wherein the permission time range includes one or more of the following four types: a time range from a time point, which is determined by going backwards from a current time for a fixed time length, to the current time, a time range from a start time to a current time, a time range from a deadline to a system initial time, and a time range from a start time to a deadline.

The permission time range further includes a time range from a system initial time to a current time.

The method further includes S24: Setting a permission for the grantee to operate content within the permission time range in the operated instant messaging account.

The operation performed by the grantee on the operated instant messaging account includes one or more types of viewing data and information, deleting data, and the like. After the permission is set, the grantee can operate communication information within the permission time range in the operated instant messaging account.

[Embodiment 4] A method for authorizing a permission to operate content in an instant messaging account in a system includes: S31, selecting one or more grantees.

The grantee includes one or more types of a role, a user, and an employee.

The role is an independent individual not a group/a class, and during the same period, one role can only be related to a unique user, while one user is related to one or more roles. The user obtains permissions of the related role. When a role is created or after a role is created, a department is selected for the role, and therefore the role belongs to the department. The role is authorized according to the work content of the role; the name of the role is unique under the department, and the number of the role is unique in the system.

When the user is transferred across the departments, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and an employee determines (obtains) permissions through a role related to his/her corresponding user. An employee and a user are bound permanently. After a user corresponds to an employee, the user belongs to the employee, and the user can no longer be related to other employees. If the employee resigns, the user cannot correspond to other employees. After the employee is recruited again, the employee still uses the original user.

The method further includes S32: Selecting one or more operated instant messaging accounts.

The instant messaging account is a role-nature instant messaging account and/or an individual-nature instant messaging account.

The role-nature instant messaging account is an instant messaging account related to a role according to the work content of the role in the system, and during the same period, one role can only be related to a unique role-nature instant messaging account, and one role-nature instant messaging account can only be related to a unique role.

The relation between the role-nature instant messaging account and the role is as follows: one role-nature instant messaging account corresponds to one role, and one role corresponds to one role-nature instant messaging account.

In this embodiment, the role-nature instant messaging account related to the role can be changed or cannot be changed, which is specifically as follows: 1. The role-nature instant messaging account related to the role cannot be changed, that is, after a role-nature instant messaging account is related to a role, the role-nature instant messaging account related to the role cannot be changed, or after a role-nature instant messaging account is related to a role and the role-nature instant messaging account is used, the role-nature instant messaging account related to the role cannot be changed. Even if a role is no longer used, the role-nature instant messaging account related to the role cannot be related to other roles, but the grantee corresponding to the role can still view the information in the role-nature instant messaging account. 2. The role-nature instant messaging account related to the role can be changed. When a role-nature instant messaging account needs to be changed for a role, the role's relation to the original role-nature instant messaging account is canceled, and the role is related to a new role-nature instant messaging account.

The source of the role-nature instant messaging account includes one or two of the following two types: 1. The role-nature instant messaging account is an instant messaging account of an instant messaging application in the system (an instant messaging account in the system), and a step of creating the role-nature instant messaging account is further included in this case. 2. The role-nature instant messaging account is an instant messaging account of instant messaging software provided by a third party (for example, a qq number, a Wechat number, or the like).

The individual-nature instant messaging account is an instant messaging account directly related to a user/an employee, and during the same period, one user/employee can only be related to a unique individual-nature instant messaging account, and one individual-nature instant messaging account can only be related to a unique user/employee.

After an individual-nature instant messaging account is related to a user/an employee, the individual-nature instant messaging account related to the user/employee cannot be changed; or after an individual-nature instant messaging account is related to a user/an employee and the individual-nature instant messaging account is used, the individual-nature instant messaging account related to the user/employee cannot be changed.

The method further includes: S33: Setting a permission time range, where the permission time range includes one or more of the following eight types:

(1) a time range from a relation time of the operated instant messaging account and its currently-related person to a system initial time;

(2) a time range from a relation time of the operated instant messaging account and its currently-related person to a current time;

(3) with a relation time of the operated instant messaging account and its currently-related person as a start point, a time range from a time point, which is determined by going backwards from the start point for a fixed time length, to a current time;

(4) with a relation time of the operated instant messaging account and its currently-related person as a start point, a time range from a time point, which is determined by going backwards from the start point for a fixed time length, to the start point;

(5) with a relation time of the operated instant messaging account and its currently-related person as a start point, a time range from a time point, which is determined by going forwards from the start point for a fixed time length, to a current time;

(6) with a relation time of the operated instant messaging account and its currently-related person as a start point, a time range from a time point, which is determined by going forwards from the start point for a fixed time length, to the start point;

(7) with a relation time of the operated instant messaging account and its currently-related person as a start point, a time range from a terminal time point, which is set additionally, to the start point; and (8) with a relation time of the operated instant messaging account and its currently-related person as a start point, a time range from a time point A to a time point B, where the time point A is determined by going backwards from the start point for a fixed time length, and the time point B is determined by going forwards from the start time for a fixed time length.

The method further includes S34: Setting a permission for the grantee to operate content within the permission time range in the operated instant messaging account.

The operation performed by the grantee on the operated instant messaging account includes one or more types of viewing data and information, deleting data, and the like. After the permission is set, the grantee can operate communication information within the permission time range in the operated instant messaging account.

The above is only a preferred embodiment of the present invention, and it should be understood that the present invention is not limited to the forms disclosed herein, and is not to be construed as being limited to the other embodiments, but may be used in various other combinations, modifications and environments. Modification can be made by the techniques or knowledge of the above teachings or related art within the scope of the teachings herein. All changes and modifications made by those skilled in the art without departing from the spirit and scope of the present invention are intended to be within the protection scope of the appended claims.

What is claimed is:

1. A method for authorizing a permission to operate content in a mailbox account in a system, comprising:
   selecting one or more grantees;
   selecting one or more operated mailbox accounts;
   setting a permission time range, wherein said permission time range comprises one or more of the following: a time range from a time point, which is determined by going backwards from a current time for a fixed time length, to the current time, the time range from a start time to the current time, the time range from a deadline to a system initial time, or the time range from a start time to the deadline;
   setting a permission for said selected one or more grantees to operate content within the permission time range in the selected one or more operated mailbox accounts;
   wherein said selected one or more grantees are configured to be related to one or more roles, wherein each role of the one or more roles is independent which is not a group or a class, and during a same period, one role of the one or more roles is configured to be related to one grantee only of the selected one or more grantees, while the one grantee of the selected one or more grantees is configured to be related to the said one role or more roles; and
   each of the selected one or more operated mailbox accounts is a role-nature mailbox account and/or an individual-nature mailbox account.

2. The method according to claim 1,
   wherein said role-nature mailbox account is a mailbox account related to one role according to work content of the one or more roles in the system, and during a same period, the one role can only be related to one said role-nature mailbox account, and the one said role-nature mailbox account can only be related to the one role according to the work content; and
   said individual-nature mailbox account is a mailbox account directly related to a user, and during the same period, the user can only be related to one said individual-nature mailbox account, and the one said individual-nature mailbox account can only be related to the user.

3. The method according to claim 2,
   wherein after the one said role-nature mailbox account is related to the one role according to the work content or after the one said role-nature mailbox account is related to the one role according to the work content and the one said role-nature mailbox account is used, the one said role-nature mailbox account related to the one role according to the work content cannot be changed; and
   after the one said individual-nature mailbox account is related to the user or after the one said individual-nature mailbox account is related to the user and the one said individual-nature mailbox account is used, the one said individual-nature mailbox account related to the user cannot be changed.

4. A method for authorizing a permission to operate content in a mailbox account in a system, comprising:
   selecting one or more grantees;
   selecting one or more operated mailbox accounts;
   setting a permission time range, wherein said permission time range comprises one or more of the following:
   (1) a time range from a relation time of the selected one or more operated mailbox accounts and a current-related entity to a system initial time;
   (2) the time range from the relation time of the selected one or more operated mailbox accounts operated mailbox account and the current-related entity to a current time;
   (3) with the relation time of the selected one or more operated mailbox accounts operated mailbox account and the current-related entity as a start point, the time range from a time point, which is determined by going backwards from the start point for a fixed time length, to the current time;
   (4) with the relation time of the selected one or more operated mailbox accounts and the current-related entity as the start point, the time range from the time point, which is determined by going backwards from the start point for the fixed time length, to the start point;
   (5) with the relation time of the selected one or more operated mailbox accounts operated mailbox account and the current-related entity as the start point, the time range from the time point, which is determined by going forwards from the start point for the fixed time length, to the current time;
   (6) with the relation time of the selected one or more operated mailbox account and the current-related entity as the start point, the time range from the time point, which is determined by going forwards from the start point for the fixed time length, to the start point;
   (7) with the relation time of the selected one or more operated mailbox account and the current-related entity as the start point, the time range from a terminal time point, which is set additionally, to the start point; or
   (8) with the relation time of the selected one or more operated mailbox account and the current-related entity as the start point, the time range from a time point A to a time point B, wherein the time point A is determined by going backwards from the start point for a first fixed time length, and the time point B is determined by going forwards from the start time for a second fixed time length;
   setting a permission for the selected one or more grantees to operate content within the permission time range in the selected one or more operated mailbox accounts;
   wherein said selected one or more grantees are configured to be related to one or more roles, wherein each role of the one or more roles is independent which is not a group or a class, and during a same period, one role of the one or more roles is configured to be related to one grantee only of the selected one or more grantees, while the one grantee of the selected one or more grantees is configured to be related to the said one role or more roles; and each of the selected one or more operated mailbox accounts is a role-nature mailbox account and/or an individual-nature mailbox account.

5. A method for authorizing a permission to operate content in an instant messaging account in a system, comprising:

selecting one or more grantees;

selecting one or more operated instant messaging accounts;

setting a permission time range, wherein said permission time range comprises one or more of the following: a time range from a time point, which is determined by going backwards from a current time for a fixed time length, to the current time, the time range from a start time to the current time, the time range from a deadline to a system initial time, or the time range from the start time to the deadline;

setting a permission for said selected one or more grantees to operate content within the permission time range in the selected one or more operated instant messaging accounts;

wherein said selected one or more grantees are configured to be related to one or more roles, wherein each role of the one or more roles is independent which is not a group or a class, and during a same period, one role of the one or more roles is configured to be related to one grantee only of the selected one or more grantees, while the one grantee of the selected one or more grantees is configured to be related to the said one role or more roles; and each of the selected one or more operated instant messaging accounts is a role-nature instant messaging account and/or an individual-nature instant messaging account.

6. The method according to claim 5, wherein said role-nature instant messaging accounts is an instant messaging account related to one role according to work content of the one or more roles in the system, and during a same period, the one role according to work content can only be related to one role-nature instant messaging account, and the one role-nature instant messaging account can only be related to the one role; and said individual-nature instant messaging account is an instant messaging account directly related to a user, and during the same period, the user can only be related to one the individual-nature instant messaging account, and the one individual-nature instant messaging account can only be related to the user.

7. The method according to claim 6, wherein after the one role-nature instant messaging account is related to the one role according to the work content or after the one role-nature instant messaging account is related to the one role according to the work content and the one role-nature instant messaging account is used, the one role-nature instant messaging account related to the one role according to the work content cannot be changed; and after the one individual-nature instant messaging account is related to the user or after the one individual-nature instant messaging account is related to the user and the one individual-nature instant messaging account is used, the one individual-nature instant messaging account related to the user cannot be changed.

8. A method for authorizing a permission to operate content in an instant messaging account in a system, comprising:

selecting one or more grantees;

selecting one or more operated instant messaging accounts;

setting a permission time range, wherein said permission time range comprises one or more of the following:

(1) a time range from a relation time of the selected one or more operated instant messaging accounts the operated instant messaging account and a current-related entity to a system initial time;

(2) the time range from the relation time of the selected one or more operated instant messaging accounts and the current-related entity to a current time;

(3) with the relation time of the selected one or more operated instant messaging accounts and the current-related entity as a start point, the time range from a time point, which is determined by going backwards from the start point for a fixed time length, to the current time;

(4) with the relation time of the selected one or more operated instant messaging accounts and the current-related entity as the start point, the time range from the time point, which is determined by going backwards from the start point for the fixed time length, to the start point;

(5) with the relation time of the selected one or more operated instant messaging accounts the operated instant messaging account and the current-related entity as the start point, the time range from the time point, which is determined by going forwards from the start point for the fixed time length, to the current time;

(6) with the relation time of the operated instant messaging account and the current-related entity as the start point, the time range from the time point, which is determined by going forwards from the start point for the fixed time length, to the start point;

(7) with the relation time of the operated instant messaging account and the current-related entity as the start point, the time range from a terminal time point, which is set additionally, to the start point; or (8) with the relation time of the operated instant messaging account and the current-related entity as a start point, the time range from a time point A to a time point B, wherein the time point A is determined by going backwards from the start point for a first fixed time length, and the time point B is determined by going forwards from the start point for a second fixed time length;

setting a permission for the selected one or more grantees to operate content within the permission time range in the selected one or more operated instant messaging accounts, wherein said selected one or more grantees are configured to be related to one or more roles, wherein each of the one or more roles is independent which is not a group or a class, and during a same period, one role is configured to be related to one grantee only of the selected one or more grantees, while the one grantee of the selected one or more grantees is configured to be related to the one role or more roles; and each of the selected one or more operated instant messaging accounts is a role-nature instant messaging account and/or an individual-nature instant messaging account.

* * * * *